US012789418B2

(12) United States Patent
Nielsen et al.

(10) Patent No.: US 12,789,418 B2
(45) Date of Patent: Nov. 10, 2026

(54) METHOD FOR MANUFACTURING PREFORMS FOR A WIND TURBINE BLADE, MANUFACTURING ARRANGEMENT FOR MANUFACTURING PREFORMS FOR A WIND TURBINE BLADE, AND MOLD FOR A MANUFACTURING ARRANGEMENT

(71) Applicant: Siemens Gamesa Renewable Energy A/S, Brande (DK)

(72) Inventors: Anette Struve Nielsen, Galten (DK); Mogens Nielsen, Aalborg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 503 days.

(21) Appl. No.: 18/284,665

(22) PCT Filed: Mar. 16, 2022

(86) PCT No.: PCT/EP2022/056894
§ 371 (c)(1),
(2) Date: Sep. 28, 2023

(87) PCT Pub. No.: WO2022/207329
PCT Pub. Date: Oct. 6, 2022

(65) Prior Publication Data

US 2024/0173898 A1 May 30, 2024

(30) Foreign Application Priority Data

Apr. 1, 2021 (EP) .................................... 21166590

(51) Int. Cl.
*B29C 33/30* (2006.01)
*B29C 33/34* (2006.01)
*B29L 31/08* (2006.01)

(52) U.S. Cl.
CPC .......... *B29C 33/306* (2013.01); *B29C 33/307* (2013.01); *B29C 33/34* (2013.01); *B29L 2031/085* (2013.01)

(58) Field of Classification Search
CPC .................................................... B29C 33/307
See application file for complete search history.

(56) References Cited

U.S. PATENT DOCUMENTS

2011/0316182 A1* 12/2011 Mortensen .............. B29C 33/34 264/101
2017/0036406 A1* 2/2017 Nielsen ................. B29C 70/526
(Continued)

FOREIGN PATENT DOCUMENTS

CN 1938142 A 3/2007
CN 103732334 B 1/2018
(Continued)

OTHER PUBLICATIONS

International Search Report & Written Opinion for PCT/EP2022/056894, issued on Jun. 17, 2022.

*Primary Examiner* — Virak Nguon
(74) *Attorney, Agent, or Firm* — Schmeiser Olsen PLLC

(57) ABSTRACT

A method for manufacturing preforms for a wind turbine blade is provided, with the steps: providing a mold p and arranging a preform building material p in a transferable mold element removably arranged on a mold carrier, fixating the preform building material in the mold element, removing the mold element with the fixed preform building material from the mold carrier and transferring it into a heating means, heating the preform building material for producing the preform, removing the mold element with the preform from the heating means and cooling the preform.

20 Claims, 5 Drawing Sheets

(56) References Cited

U.S. PATENT DOCUMENTS

| | | | | |
|---|---|---|---|---|
| 2019/0168327 | A1* | 6/2019 | Yoshida | C23C 4/02 |
| 2020/0384707 | A1* | 12/2020 | Lehmann Madsen | B29C 70/38 |
| 2020/0398459 | A1* | 12/2020 | Kristian Lehmann Madsen | B29C 70/42 |

FOREIGN PATENT DOCUMENTS

| | | | |
|---|---|---|---|
| EP | 1603723 | A1 | 12/2005 |
| EP | 2362824 | A1 | 9/2011 |
| EP | 2661357 | A1 | 11/2013 |
| EP | 2731772 | A1 | 5/2014 |
| EP | 3018342 | A1 | 5/2016 |
| EP | 3102396 | A1 | 12/2016 |
| WO | 2019/115337 | A1 | 6/2019 |
| WO | 2019/115522 | A1 | 6/2019 |
| WO | 2019145240 | A1 | 8/2019 |

* cited by examiner

METHOD FOR MANUFACTURING PREFORMS FOR A WIND TURBINE BLADE, MANUFACTURING ARRANGEMENT FOR MANUFACTURING PREFORMS FOR A WIND TURBINE BLADE, AND MOLD FOR A MANUFACTURING ARRANGEMENT

CROSS-REFERENCE TO RELATED APPLICATIONS

This application claims priority to PCT Application No. PCT/EP2022/056894, having a filing date of Mar. 16, 2022, which claims priority to European Application No. 21166590.6, having a filing date of Apr. 1, 2021, the entire contents both of which are hereby incorporated by reference.

FIELD OF TECHNOLOGY

The following relates to a method for manufacturing preforms for a wind turbine blade.

BACKGROUND

As commonly known, a wind turbine comprises among others several turbine blades attached to a hub. The blades interact with the wind making the hub rotate. To the hub a generator is coupled, which is driven by the rotating hub. The turbine blades of nowadays turbines have enormous dimensions in length and width. Their manufacturing is therefore difficult, as big parts need to be handled. One technology for producing such large blades uses preforms, which are preformed smaller blade parts used for building the respective blade shell. These prefabricated preforms are arranged and aligned according to the requested overall geometry of the blade and are finally connected respectively embedded in fiber mats and resin etc. for manufacturing the final large blade or blade part.

Each preform, which usually has a slightly bended geometry with a length of for example 10-12 m and a width of for example 3-5 m, is prefabricated in a specific mold. The mold comprises a respective form part, in which the preform building elements like fiber mats and a binding agent and, in some embodiments, core elements, are arranged. These elements are consolidated in the respective mold part by applying a vacuum, which mold part has a defined geometry corresponding to the requested blade geometry. For this consolidation the preform building elements are covered with for example a foil, so that the vacuum can be applied to the space between the foil and the mold part, in which the building elements are arranged. Afterwards heat is supplied to the building elements in order to melt the locally positioned binding agent for locally fixing the fiber mats and the core elements etc. by gluing them in the binder matrix provided by the molten binding agent. After this heating operation the preform needs to be cooled to room temperature, whereafter it is sufficiently stable to be handled by a crane equipment or any other comparable handling or lifting means, usually a vacuum suction lifting equipment.

This way of producing the preforms is quite cumbersome. The molds used for producing the preforms are very complicated in their set-up, especially as a heating and cooling system needs to be provided in every mold. This makes the mold very expensive, having in mind that a large number of separate molds is necessary, as usually at least twenty or more preforms are needed for producing a blade or blade part. Further, as the respective mold geometry is designed for a respective geometry of the preform, an extensive reworking of the mold is necessary, when the preform geometry shall be changed, entailing also the adaption of the heating and cooling equipment.

Further, as both the heating and cooling treatment is performed with the preform building elements respectively the hot preform being arranged in the mold, the mold is occupied. As the heating and the cooling process takes a remarkable time, the whole mold is blocked during these long-lasting procedures, the productivity is extremely low. This is even enhanced, as the mold cannot be preheated. The temperature treatment thus needs to start from room temperature, as all building elements need to be separately arranged in the mold before their vacuum consolidation, whereafter the heating may start. Further, it is necessary to cool down the hot preform to room temperature in order to secure its stability for handling it with the lifting equipment. Further, the time during which the respective mold is occupied may even be extended, as sometimes a preform is not removed immediately after cooling it, but instead remains for a certain time in the mold if no storing capacity is given.

Finally, after lifting the preform out of the mold, it is necessary to thoroughly clean the mold surface for the next manufacturing process, which cleaning step also takes its time. Still the mold cannot be used, until this cleaning step is finished.

SUMMARY

An aspect relates to a method for producing a preform for a wind turbine blade.

To address the aspect, embodiments of the invention propose a method for manufacturing a preform of a wind turbine blade, with the steps:

- Providing a mold and arranging a preform building material in a transferable mold element removably arranged on a mold carrier,
- Fixating the preform building material on the mold element,
- Removing the mold element with the fixated preform building material from the mold carrier and transferring it into a heating means,
- Heating the preform building material for producing the preform,
- Removing the mold element with the preform from the heating means and cooling the preform.

According to embodiments of the invention, a specific new mold type is used for manufacturing preforms. This mold type comprises a mold carrier, to which a mold element, which provides a mold surface corresponding to the geometry of the preform to be built, is removably fixed. The mold element is therefore transferable and can be removed from the carrier. The mold itself respectively the mold element is only used for arranging and fixating the building material on it. Right after placing and fixating the building material, the transferable mold element is removed from the mold carrier and is transferred to a heating means, for example a heating oven, in which the building material is heated respectively the binding agent is molten and/or activated for fixing or adhering respectively gluing the fiber material like fiber mats and/or the core elements etc. in the binder matrix. After this heat treatment the preform is cooled for example to room temperature by a cooling treatment, whereafter the final preform can be lifted from the transferable mold element with a respective lifting equipment.

During the whole manufacturing process the building material respectively the preform is arranged on the movable mold element and is therefore moved with the mold element between the respective manufacturing stations. As this mold element is plate-like with a tray-like element surface, the whole construction set-up of this mold element and the building elements respectively the preform itself is quite thin and therefore very easy to handle. Following the placement and fixation of the building material, for example by vacuum fixation, the plate- or tray-like mold element can be removed from the mold carrier and transferred to the heating means for further processing.

In embodiments, the method shows a bundle of advantages. As the mold itself is solely used for arranging the building material on the mold element and for fixing it to the mold element, no heating or cooling treatment is performed in the mold. Therefore, the mold design is very simple, as no heating or cooling equipment needs to be provided at the mold. Further, as the mold carrier, which may be a frame-like carrier or the like, is not exposed to any heating or cooling, it will be dimensionally stable and last longer, as it is solely carrying the mold element and the building material.

As only the packing is done in the mold and right after finishing this packing the mold element is removed, immediately afterwards a new mold element may be arranged on the mold carrier. This allows to immediately start with the arrangement of new building material on the mold element of the same mold, which was occupied short time before. This allows to remarkably increase the throughput and the capacity. As usually a certain number of separate molds are provided, an ongoing production may be realised, as it is only necessary to provide a respective number of separate mold elements, which can be interchanged with the respective mold carriers.

As only the mold element with the fixated building material needs to be removed from the mold carrier for the further processing, no specific lifting means directly at the mold is necessary, as the plate- or tray-like mold element may simply be removed from the mold carrier for example by a linear pushing or pulling action.

As the heating is performed in a heating means separate from the mold, which heating means is solely used for heating the building material, this heating means respectively the oven can be pre-heated, so that it is constantly held on the respective process temperature. It is desired that the heating means has a respective capacity, so that several plate- or tray-like mold elements with building material may be simultaneously arranged in the heating means respectively the oven, which further contributes to raising the capacity and the throughput of the manufacturing arrangement. The building material is heated e.g., to a temperature of 80°-100°.

Further, as the building material respectively the preform is arranged on the movable mold element throughout the whole manufacturing process, the handling is improved, as it is not necessary to get in contact with the preform element at any time until it is finally produced. Further, as the mold element together with the vacuum cover, e.g., a foil, provides a perfect protection of the preform, it is possible to store the mold element with the preform in stock after the cooling process. Thus, contamination of the preform with e.g., dust particles, moisture penetration and/or material degradation can be avoided.

When the preform is removed from the mold element, the mold surface of the mold element may receive immediately a surface treatment before it is again placed on the mold carrier. As the system comprises several mold elements, there is always a clean mold element at hand right after a mold element with the fixated building material is removed from a mold carrier, so that the new mold element can be placed on the mold carrier and a new cycle may start.

In embodiments, the method allows for a remarkably higher throughput in the production of preform elements, as the steps of arranging and fixating the building material are the only steps performed directly at the mold, while the heating and cooling steps are separated and are solely performed using the removed mold element with the fixated building material.

As mentioned, the mold element is a multi-functional element. It is used as the receiving element, which receives the building material, and which defines the shape and/or form, in which the building material is arranged. It is further a fixation element, as together with the vacuum foil it is used for fixating the building material. Further, it is used as a transport element, as it is removed and transported from the mold carrier through the following manufacturing stations, always securing that the fixated building material or the preform remains in shape. To accomplish these multi-functional characteristics, a mold is used comprising a mold carrier with a removable stiff tray-like mold element providing a mold surface on which the building material is arranged. According to this embodiment, the mold element itself is stiff and completely stable in its form. It is made of a plate which is formed or machined to provide the respective mold surface on which the building material is arranged. The mold element respectively the plate it may be made of has a thickness of for example 2-5 cm. As the mold element itself is stiff, form stable and heat resistant even at elevated temperatures i.e., well above the temperature applied in the heating means, the stability of the vacuum-fixed building material is ascertained, as the mold element itself provides this stability, although the building material is securely fixed by the vacuum.

As mentioned, the building element may comprise at least a fiber material, in the form of fiber mats, be it glass fiber or carbon fiber mats, while also both types of mats may be used in building a preform. Further, the building material comprises a binding agent, usually in the form of a binding powder, granulate or the like but may also be a liquid or hot melt based binding agent, which binding agent is usually locally applied below, between or above the respective fiber material or fiber mats. Further, one or several core elements may in some embodiments be arranged, for example core elements made of wood such as balsawood or a foam, e.g., a synthetic foam, or the like. The stack is locally fixed by the molten binding agent in order to maintain it open for a resin infiltration during the manufacturing process of the turbine blade or blade part.

As also mentioned, the preform building material is fixated on the mold element by at least one vacuum cover covering the preform building material and an applied vacuum. This vacuum cover is a vacuum foil, which is thoroughly placed over the building material, and which overlaps with the mold element, whatever kind this mold element is. By applying a vacuum between the mold element and the vacuum cover, the space in between, in which the building material is arranged, is evacuated and the vacuum cover is sucked towards the mold element, thereby fixating the stacked building material.

In an embodiment, the vacuum established is maintained during any subsequent process steps, and in particular only released at the earliest after the heating process but may also be maintained throughout the cooling process as well and even more only released prior to the preform element is to be released from the mold element and even so only just prior to the preform element is to be used and placed in a blade mold. The vacuum is established by using appropriate vacuum means such as a pump connected with hoses and valves attached to the vacuum cover allowing to couple and decouple such vacuum means. Thus, the vacuum established may during or prior to any subsequent process steps be checked, e.g., using an appropriate pressure measuring device such as a manometer. If the pressure is above a certain threshold the vacuum can again be brought back to the desired level using vacuum means. The use of e.g., hoses and valves also provides the option to blow e.g., air into the vacuum cover as to ease the release of the cover from the mold element and/or preform building material or the preform element after the heating or cooling process step.

As mentioned, after the building material is arranged and fixated on the mold element, the mold element itself is removed from the mold carrier in order to transfer it to the heating treatment. For transferring the mold element to the heating means, the mold element with the fixated preform building material is transferred from the mold carrier to a mold transport means and either stored in the transport means until it is transported with the transport means to the heating means or directly transported with the transport means to the heating means. According to this embodiment, a mold transport means is provided, which is adapted to receive at least one mold element with the respective fixated building material. This transport means now may either serve as a kind of buffer, which allows to store the at least one or, if it is adapted to store more than one mold elements, the several mold elements until the time they will be further processed in the heating means. In an alternative the transport means may directly transport the one or the several mold elements to the heating means.

In an embodiment, more than one mold elements are transferable to a common, rack-like transport means. The transport means thus is adapted to receive a certain number of mold elements with preform building material, for example five to ten. The transport means respectively the rack has respective compartments, for example arranged vertically stacked, with each compartment receiving one mold element. This allows to either store a higher number of mold elements in the rack-like transport means for buffering them, or for moving the higher number simultaneously directly to the heating means.

For collecting the several mold elements in the tray-like transport means, the transport means moves from a first mold carrier for receiving a first mold element to one or more further mold elements. For this purpose, the transport means may move or be moved on respective rails or guides arranged in or on the floor, e.g., along a row of separate molds or mold carriers for collecting the respective mold elements for further processing.

After the transport means has received the one or the several mold elements, they are transferred to the heating means, either directly or after a certain delay. For moving the mold elements into the heating means like the oven, several alternatives are feasible. According to a first alternative the transport means with one or more mold elements moves into the heating means. Here the transport means itself with the mold elements moves into the oven and remains with them in the oven during the entire heat treatment. In an alternative embodiment, one or more mold elements are moved from the transport means into the heating means. Here the transport means moves in a transfer position, in which the or each mold element is transferred from the transport means into the oven for the heat treatment. The transport means in this embodiment can immediately return and start again collecting mold elements. In this embodiment, the heating means respectively the oven has separate compartments each receiving a mold element, as the oven has a dimension which allows to process an enlarged number of mold elements simultaneously. So, it is either dimensioned and comprises a certain number of compartments to receive a respective number of mold elements, or it is dimensioned to receive the whole transport means with the mold elements. In any case the oven may be designed to house several mold elements or mold element transport means placed parallel or in extension of one another. After the heat treatment, the mold elements respectively the now generated preform needs to be cooled. While the first step regarding the arrangement of the building material and the fixation of the same is the only step performed on the mold, the following processes are separate from the mold, also the cooling process is separated from the heating process respectively the oven. This means that the hot preforms and mold elements will not stay in the oven during the cooling process, which allows to immediately use the heating means again right after the mold elements are removed from the oven.

The cooling process may also be performed in various ways. It is possible that after the heating the one or more mold elements are removed from the heating means and are cooled in ambient air. According to this embodiment the mold elements with the hot preforms are simply moved out of the oven and left to cool down in a cooling area or the like and thus in the ambient air. To avoid that the temperature within the manufacturing facility gets too high due to this cooling, the ambient air cooling should take place in an area outside of the manufacturing building. In an alternative to the ambient air cooling, the mold elements may be moved into a cooling means. Here a specific cooling means, where an active cooling is performed, is provided. Like the heating means, which may be an oven with a respective heating source, the cooling means may also be a housing with a respective cooler like a cooling fan or the like. If the heating means and the cooling means are for example placed close to each other, it is possible to establish a kind of energy recycling, as the heat dissipating from the cooling preforms may be transferred to the heating means.

As already mentioned, it is possible to either move the transport means, i.e., the rack, with the several mold elements into the heating means, or to move only the separate mold elements into the heating means. If the whole rack is in the oven, only the whole rack with all mold elements is removed from the oven, yet individual elements can also be removed from the rack. If the separate mold elements are individually placed in the oven, they may likewise be removed separately from the oven. By removing individual mold elements from the oven, this allows to differently heat respective mold elements and their preform building material, as depending on their respective set-up, e.g., one preform may need a longer heat treatment, while another preform needs a shorter heat treatment. So, the introduction of the separate mold elements into, and eventually out again, the oven brings more flexibility regarding the heating process.

Resulting from these various ways of arranging the mold elements in the heating means, also various embodiments regarding the transfer for the next cooling step are feasible. According to a first alternative the transport means comprising the one or the more mold elements is transferred into the cooling means. Here, as the occupied transport means respectively rack is in the oven, the whole transport means with the hot mold elements and preforms is moved from the oven into the cooling means like the cooling chamber or the like. In an embodiment, respective rails or other kind of guides are provided allowing a simple transfer of the rack from the oven to the cooler.

In an alternative embodiment the one or more mold elements itself are transferred from the heating means onto a transport means or a further transport means, wherein either the transport means remains or moves into ambient air for cooling, or wherein the transport means moves to the cooling means, with either the one or the more mold elements are transferred into the cooling means or the transport means moves into the cooling means. In this alternative, the separate mold elements arranged in the oven are transferred to and collected on a separate transport means arranged at the exit of the heating means. This transport means, just like the transport means arranged between the molds and the heating means, is adapted to receive a respective number of mold elements with their preforms. Depending on the cooling process two variations are feasible. First, the transport means remains or moves into ambient air for cooling. Here the rack with the preforms either remains close to the heating means or moves to a specific cooling area, where an ambient air cooling is performed. In an alternative, the transport means moves to the cooling means, i.e., the specific ventilation cooler or the like, where either the separate mold elements are removed from the transport means and transferred into the cooling means, where respective separate compartments are arranged for receiving them. In an alternative, the whole transport means may move into the cooling means. In any case the cooling means may be designed to house several mold elements or mold element transport means placed parallel or in extension of one another.

Finally, it is also possible that the mold elements itself are directly transferred from the heating means into the cooling means. Here, the heating and the cooling means are directly arranged in line and are provided with respective transport devices, so that the mold elements with the preforms may directly be shifted from the heating to the cooling unit. These transport devices may again be rails or roller guides or the like.

As is obvious, several possibilities for bringing the respective hot mold elements with the hot preforms to the cooling means or area(s) are feasible.

After the cooling, the respective fabricated preforms are removed from the mold element. This is done by a lifting equipment, a vacuum lifting means. With this equipment the respective preforms are either moved to a storage side or directly to the further processing, where the preforms are arranged in a large blade mold for finally producing the blade. If the mold elements with the preforms are arranged on a transport means, they need to be removed from the transport means, for which purpose they may for example be transferred to a kind of conveyor or the like, by which they are transported to the lifting equipment. This may necessitate to certainly move the occupied rack out of the cooling unit respectively to move the separate mold elements with the preforms out of the cooling unit in case no ambient air cooling is performed.

The vacuum cover or the like and/or the release film if so used, is eventually removed from the preform element after cooling of the preform e.g., prior to placing the preform into the blade mold.

Embodiments of the invention further refer to a manufacturing arrangement for manufacturing preforms for a wind turbine blade, comprising:

One or more molds each comprising a mold carrier and one or more assigned mold elements each adapted to fixedly receive preform building material and removably arrangeable on the mold carrier, A heating means adapted to receive at least one of the mold elements, with the preform building material, removed from the mold carrier.

In an embodiment, there is a larger number of molds, for example 5, 10 or 20 molds. In an embodiment, the number of mold elements is greater than the number of carriers, so that the molds may permanently be used, as immediately after removing a mold element with the fixed preform building material a new, cleaned if necessary, mold element may be arranged on the mold carrier and new building material may be arranged on the surface of the mold element. So, for this ongoing cycle process a certain number of separate, interchangeable mold elements are necessary. The mold elements, which are assigned to a common mold carrier, may all be the same, so that this respective mold always produces the same type of preform element. But certainly, in an alternative, the mold elements may also be completely switched between the respective mold carriers.

Each mold element may be a stiff tray-like mold element providing a mold surface adapted to receive the preform building material with the mold carrier comprising mold element receiving means. In this embodiment, the mold element itself is form stable and for example made from a stiff and rigid plate, which is respectively machined in order to provide the respective formed mold surface, onto which the preform building material is arranged. The mold element may e.g., be 3-D printed i.e., an additive preparation process, casted or form pressed. This stiff mold element is removably placed onto the mold carrier, which may be a simple frame-like carrier arrangement, and which is provided with the respective receiving means. These receiving means may for example be longitudinal rails or bars or the like, on which the stiff mold element is arranged with its longitudinal edges.

The stiff mold element may for example be made of metal like aluminium or made of a sufficiently heat-resistive polymer or wood and may comprise a surface which is not adhesive to the binding agent. If the surface is adhesive to the binding agent, a release film or similar release agent may be placed on the mold element surface prior to placing the preform building material. This stiff element may have a thickness of for example 1-5 cm, depending on the material it is made of. The cleaning may be performed with respective automatic cleaning means, to which the respective mold element is automatically transferred after the preform is removed, and from which the cleaned mold element is recirculated back to the area with the mold carriers. So it is a circular process starting with the mold section, where the mold elements are placed on the carriers, followed by arranging of the building material, followed for example by the transfer to the transport means, followed by the transfer of the mold elements into the heating means in the above mentioned different ways, followed by the heating step, which is followed by the cooling step, which may also be performed in various ways, whereafter the preforms are removed and further processed, while the emptied mold elements are automatically cleaned and recirculated back to the beginning of the process cycle.

The manufacturing arrangement further comprises at least one mold element transport means adapted to receive one or more mold elements with the fixated preform building elements for transferring the one or more mold elements to the heating means. This transport means, which is adapted to receive several mold elements, is used to transport the one or the more mold elements from the respective mold carriers to the heating oven. It comprises respective receiving or fixation means for the respective mold elements like respective rails or bars or the like, on which the edges of the mold elements rest. The transport means may either transport the mold elements directly to the heating means or first to a storing location and afterwards to the heating means.

Furthermore, the mold element transport means is adapted to receive the rectangular mold elements by receiving it from the longitudinal element side or from the shorter element side. The mold element may therefore either be inserted from the side vertical to the longitudinal axis or from the front along the longitudinal axis.

The mold element transport means, which is adapted to receive several mold elements, comprises vertical movable mold element receiving means for vertically stacking the several mold elements. Here, the transport means respectively the rack is provided with a kind of paternoster lift or the like, thus any kind of elevating means, which allows for example to take the first mold element in the lowest position, whereafter this first mold element is lifted, until a second mold element may be introduced, both of which elements are then lifted etc. This lifting means may for example be circulating chains, belts or the like, to which the respective receiving elements are arranged. Such arrangement allows the mold elements to easily slide (pushed or pulled) into the receiving the mold element transport means with little or no lifting efforts. Accordingly, only a horizontal movement of the mold elements needs carried out which limited the need for lifting of the mold elements by machine or persons.

The heating means itself may be adapted to receive one, more mold elements itself. Here, the mold elements with a building material are directly introduced into the oven. In an alternative, the heating means may also be adapted to receive the transport means comprising the one or more mold elements. In this embodiment the complete rack with the transport elements is moved into the heating means.

If the heating means is adapted to receive the mold elements itself, it may comprise vertically moveable mold element receiving means for vertically stacking the several mold elements. Again, the mold element receiving means may be an elevator means like a paternoster lift or the like, which allows to vertically move the mold elements for vertically stacking them. Again, the first mold element is for example received in the lowest position, whereafter it is vertically moved for a first distance, whereafter the second mold element is introduced, both of which mold elements are then again moved vertically, etc. Again, such arrangement provides a horizontal movement only of the mold elements which limited the need for lifting of the mold elements by machine or persons.

Further, the arrangement may comprise a cooling means adapted to receive the one or more mold elements with the heated preforms for cooling them. This cooling means allows for an active cooling operation for example by using a cooling fan for removing the heat, wherein the cooling means may be coupled with the heating means in order to establish an energy recycling. The cooling means, which may be a kind of cooling chamber or cooling box, is adapted to receive one, more mold elements itself, while also the whole transport means comprising the one or more mold elements may be received by the cooling means. Again, just like at the heating means, also here only the mold elements with the heated preforms may be separately received in the cooling means, or the occupied transport means respectively the rack.

In this circumstance, the transport means received by the cooling means may be the transport means which was previously positioned in the heating means. According to this embodiment, the transport means respectively the rack is directly transferred from the oven to the cooler, for example automatically and rail guided. In an alternative, if the oven has received the separate mold elements, the transport means is adapted to receive the one or more mold elements from the heating means.

If the cooling means is adapted to receive the mold elements itself, it may comprise vertically movable mold element receiving means for vertically stacking the several mold elements. Also, the cooling means may be provided with a lifting means like a paternoster lift or any other kind of elevating means, which is adapted to take the separate mold elements. Again, they may be received from the transport means at a lower position, whereafter the first mold element is lifted to a second position, where another mold element is received, etc. Again, such arrangement provides a horizontal movement only of the mold elements which limited the need for lifting of the mold elements by machine or persons.

As mentioned above, it is possible that certain transfers of a mold element from one position to another position or from one item to another item may be performed. To conveniently accomplish these transfers, transfer means for transferring a mold element from the mold carrier to the transport means and/or from the transport means to the heating means and/or from the heating means to the further transport means or the cooling means or from the further transport means to the cooling means are provided. No matter how the set-up is, the transfer means are provided to ease the transfer from one device to a following device of the arrangement. In an embodiment, these transfer means work automatically, but may also involve partial manual operation like pushing or pulling operation. So, these transfers may be accomplished automatically by respective drive motors or the like, whereas in some cases also some manual handling is possible.

The transfer means itself may comprise pushing means arranged at the mold and/or at the transport means, and/or pulling means arranged at the transport means and/or at the heating means, and/or rolling elements arranged at the mold and/or at the transport means bearing the mold elements. These pushing or pulling means may comprise certain pushing or pulling rods or the like, which may automatically couple the mold element to be pushed or pulled e.g., by a motor drive. Also, roller elements may be arranged on respective guide rails or the like, allowing for a simple movement of the heavier mold element with the building material or the preform, which movement may also at least be initiated by manual pushing or pulling, as the roller elements allow for a very smooth and soft movement. It is to be noted that a mold element, no matter if any kind of transfer means is provided or what kind of transfer means is provided, is locked to the respective device by locking elements. So, the mold element is for example releasably locked to the mold carrier or to the transport means or to the respective mold element receiving means in the heating oven or the cooling unit etc. These locking means may engage automatically, when the mold element is in place, and may also disengage automatically, when it shall be removed.

As mentioned, the or each transport means is used for collecting several mold elements from the respective mold carriers or for moving them to the heating means or from the heating to the cooling means etc. In an embodiment, each transport means is, automatically, movable along respective guiding rails. These floor-based rails ascertain a defined and secure pathway.

Finally, embodiments of the invention refer to a mold for a manufacturing arrangement as previously described. This mold is characterised by a mold carrier and at least one interchangeable mold element, which mold element is a stiff tray-like mold element providing a mold surface adapted to receive the preform building material, wherein the mold carrier comprises mold element receiving means.

As the building material is vacuum-fixated on the mold element, the mold carrier also comprises a respective vacuum fixation means for fixing the building material to the mold element using a vacuum cover, e.g., a foil, a vacuum mat or the like, a foil since it is lightweight and easy to handle.

Finally, the mold comprises a transfer means for moving the mold element from the mold carrier, which transfer means comprises a, automatic, pushing means and/or rolling elements arranged at the mold carrier.

BRIEF DESCRIPTION

Some of the embodiments will be described in detail, with reference to the following figures, wherein like designations denote like members, wherein.

DETAILED DESCRIPTION

Figure 1:
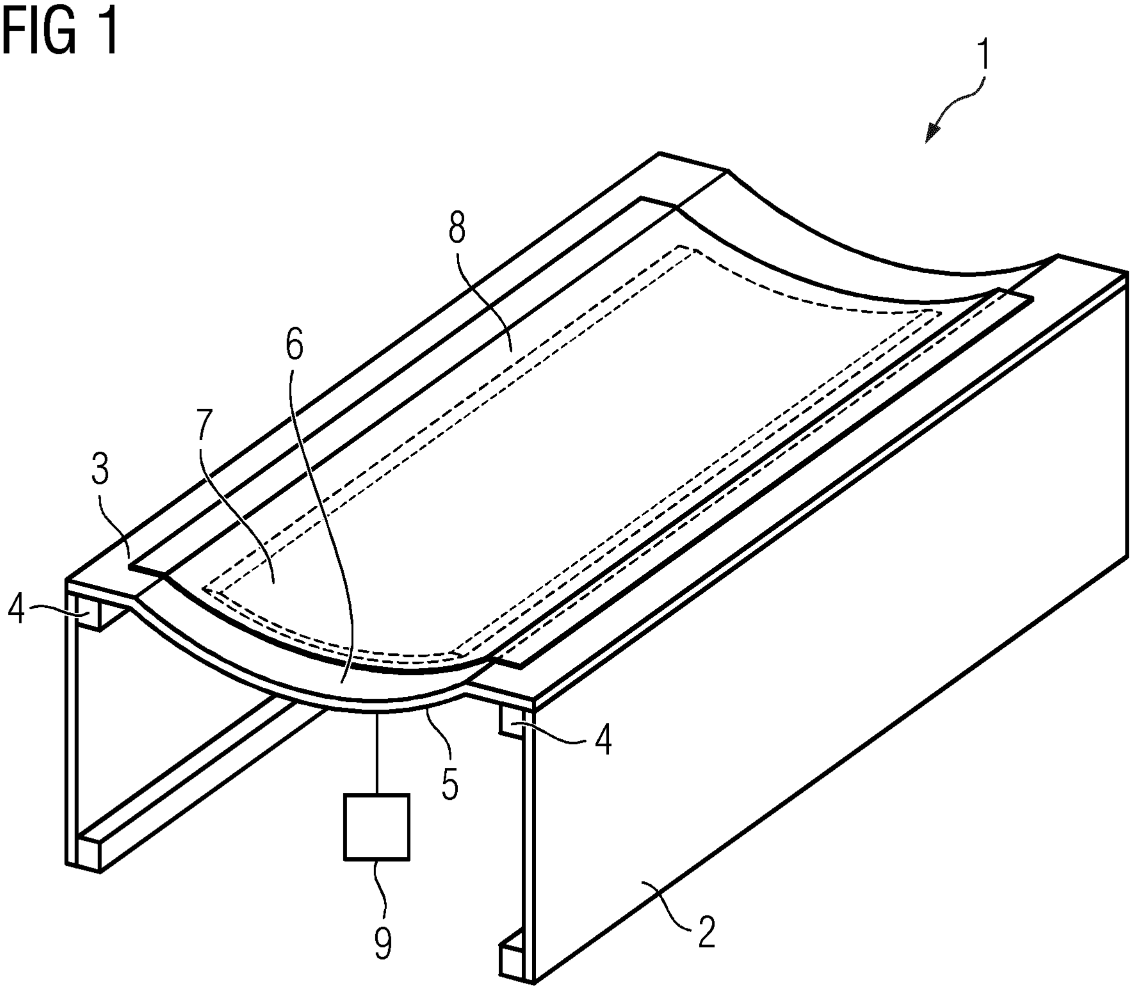
FIG. 1 is a principle illustration of an inventive mold of a first embodiment.

FIG. 1 shows a principle illustration of a mold 1 for manufacturing a preform for a wind turbine blade. The mold 1 comprises a mold carrier 2, to which a removable or interchangeable mold element 3 is attached. The mold carrier 2 comprises respective receiving elements 4, for example longitudinal rails or beams or the like, on which the mold element 3 rests. It may be fixed thereto by respective locking elements, which are released when the mold element 3 shall be removed.

The mold element 3 comprises a tray-like recess 5 with a mold surface 6, on which building material 7 for building the preform is arranged. The building material 7 comprises fiber material like fiber mats made of glass or carbon fibers, and a binding agent usually in powder or granular form. A liquid or hot melt binder may however also be used. The building material 7 is arranged in the respective order respectively the needed amounts, wherein the building material 7 obviously follows the tray-like form of the mold surface 6.

After arranging all the building material on the surface 6, a vacuum cover 8 is arranged which overlays the building material 7 and extends also onto the surface 6 of the mold element 3, as FIG. 1 shows. The mold carrier is equipped with a vacuum fixation means 9 comprising a vacuum pump and respective hoses or the like with valves allowing to couple and decouple the means 9 to the mold element 3, allowing to generate a vacuum between the mold element 3 and the vacuum cover 8 in order to evacuate the space between them, where the building material 7 is arranged. This evacuation or vacuum fixation fixes the building material 7 very tightly to the mold element 3.

The mold element 3 itself is a rigid plate-like element, which is made from a respective stiff plate for example made of a metal such as steel, aluminium or the like or a plastic that is heat resistant and form stable during the heating process that will follow. This e.g., steel or aluminium plate is shaped accordingly in order to prepare the tray-like or convex mold surface 6.

As mentioned, the mold element 3 is removable from the mold carrier 2. After vacuum fixation of the building material 7, it is possible to remove the mold element 3 with the fixed building material 7 and the vacuum cover 8 after decoupling it from the vacuum fixation means 9, while the vacuum is maintained between the mold element 3 and the vacuum cover 8, so that also the fixation of the building material is maintained. The mold element 3 can now be moved to a heating means for further processing. Solely, the mold carrier 3 remains in place and may be equipped with another new and clean mold element 3, on which immediately after removal of the previous mold element 3 a new building material 7 may be arranged etc.

The first embodiment according to FIG. 1, as mentioned, comprises a stiff and form stable, plate-like mold element 3, which is removably arranged on top of the mold carrier 2, e.g. simply by lowering it on the carrier 2 with a lifting means or by pushing it on the mold carrier 2 with a transport means or by hand. As the mold element 3 itself is stiff, the handling is easy, no form or shape change occurs during the handling and further processing.

Figure 2:
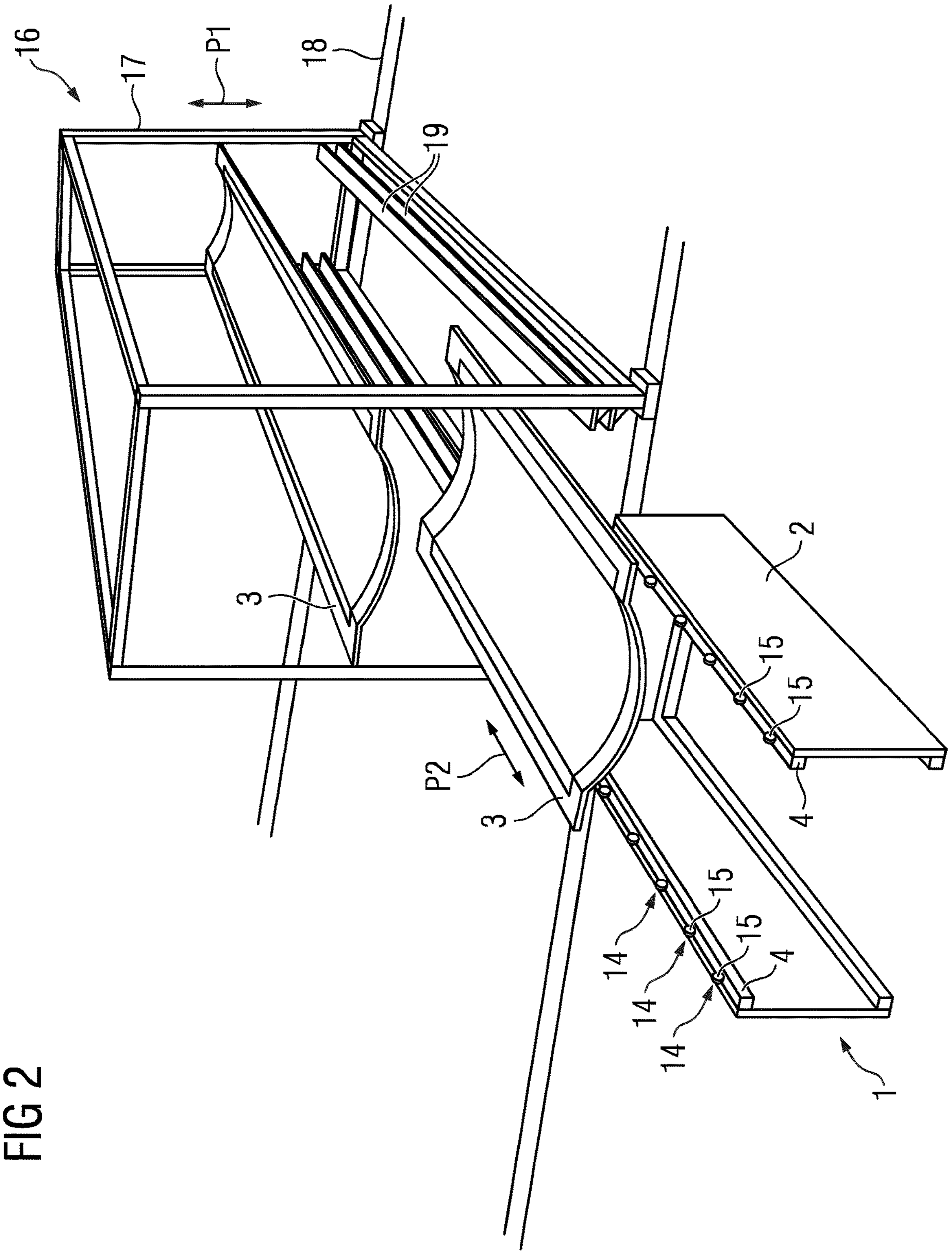
FIG. 2 is a principle illustration of an inventive mold with a transport means for receiving mold elements.
Figure 3:
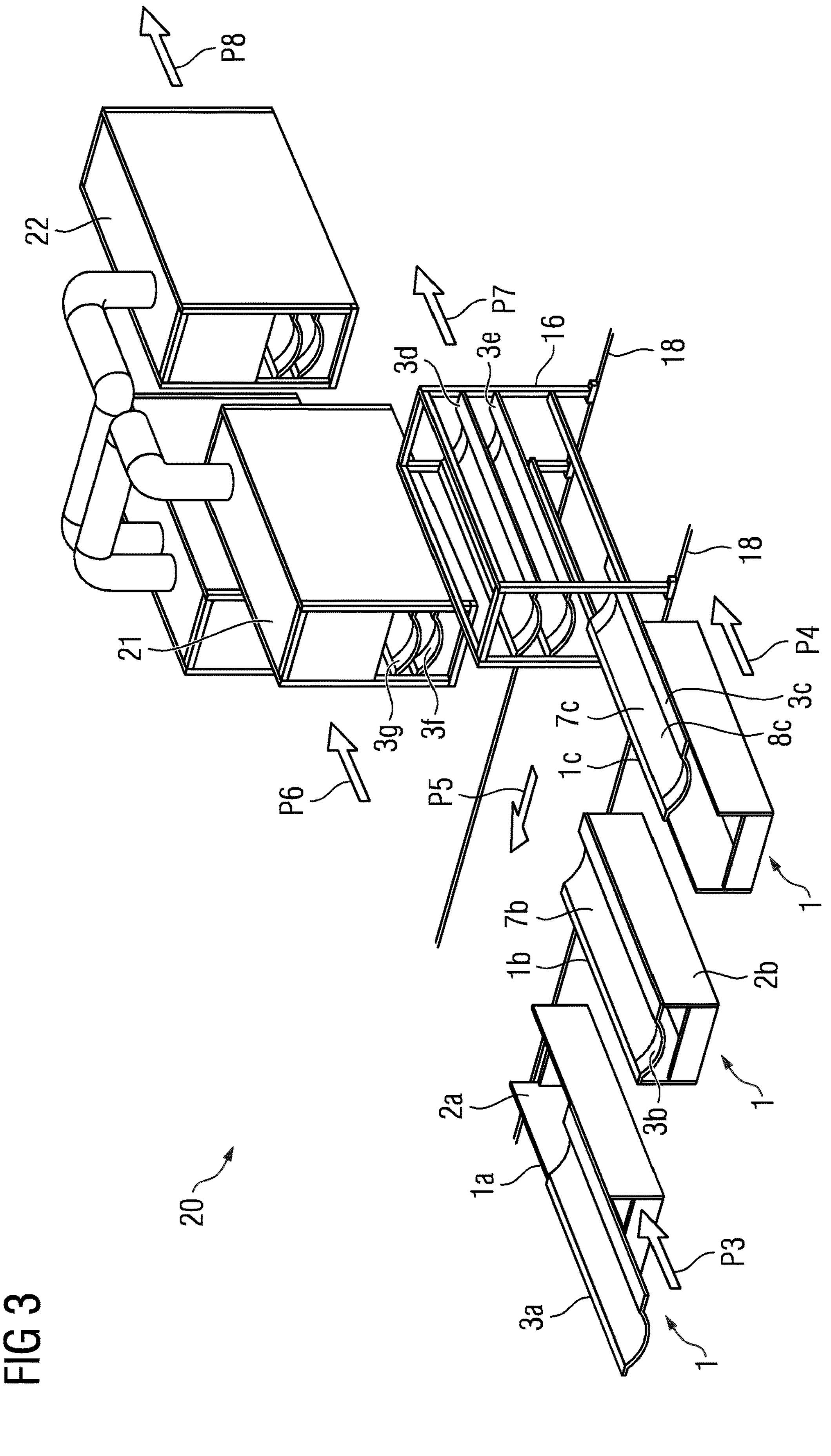
FIG. 3 is a principle illustration of a manufacturing arrangement.

FIG. 2 shows the inventive mold 1 according to FIG. 1. The mold element 3 with the vacuum-fixed building material is already partially moved from the mold carrier 2. The receiving means 4 are equipped with respective transfer means 14 here in form of the respective roller elements 15, on which the mold element 3 rolls and can easily be pushed or pulled in order to transfer it to a transport means 16, here in form of a rack 17. This transport means 16 is movable and guided on respective rails 18, so that it can e.g., automatically move along several molds 1, which are arranged side by side, one of which is only shown in FIG. 3. The transport means 16 is adapted to receive several of the mold elements 3 with the vacuum-fixed building material 7. As FIG. 3 shows, already one mold carrier 2 from a not-shown mold 1 is already received in the rack 17. The rack 17 comprises respective receiving means 19, here in form of longitudinal bars or carriers, which are e.g., provided with rollers or the like in order to easily move the mold element on them. The receiving means 19 are, as shown by the arrow P1, vertically movable, so that respective receiving means may be moved in place to receive a new mold element 3, whereafter the receiving means 19 with the mold element 3 is vertically moved and another receiving means 19 is moved in place in order to receive another mold element 3. The mold elements 3 are, as shown by the arrow P2, simply pushed into the rack 17 by respective pushing means, which may be arranged at the carrier 2, while these pushing action may also be performed manually, as the mold element 3 rolls on the roller elements 15. It may also be pulled into the rack 17 by using respective pulling means arranged at the rack 17. These pushing or pulling means may for example be pushing or pulling rods or the like.

The vertical movement of the receiving means 19 may be performed by respective electric motors or for example driving circulating chains or belts, to which the receiving means 19 are coupled, or respective spindle drives or the like. Also, the respective pushing or pulling means may be motor driven.

FIG. 3 shows a first embodiment of an inventive manufacturing arrangement 20 for producing preforms for turbine blades. It shows in this example three molds 1, which are arranged side by side. The mold 1*a* is equipped with a new mold element 3*a*, which is, see the arrow P3, pushed or anyhow else placed on the mold carrier 2*a*. The second mold 1*b* is equipped with the mold element 3*b* arranged on the mold carrier 2*b*. The building material 7*b* is already arranged on the mold element 3*b*, but for example not yet vacuum-fixed.

Finally, the mold element 3*c* of the third mold Ic is ready for the further processing and is therefore, as shown by the arrow P4, moved into the transport means 16 respectively the rack 17. The mold element 3*c* comprises the building material 7 covered by the vacuum cover 8*c*, it is therefore vacuum-fixed. As shown, it is already partially moved into the rack 17, in which already two other mold elements 3*d*, 3*e* are arranged.

The rack 17 moves on the respective rails 18 in the direction of the arrow P5 and therefore along the respective molds 1. At each mold 1 the respective mold element 3 comprising the fixed building material is received on respective receiving means 19 of the rack 17, until the rack 17 is fully loaded.

The rack 17 then moves to a heating means 21, i.e., a heating oven, which can be pre-heated respectively remains always at a certain temperature level necessary for melting the usually only locally applied binding agent in order to embed all the fiber material and core material etc. in a respective fluid binding matrix. Several mold elements are moved into the heating means 21, as shown by the arrow P6. In this illustration already several mold elements 3*f*, 3*g* are already in this heating means 21, which is shown partially opened just for illustration purpose. They are heated for a certain time necessary to build the preform. Regarding the way the mold elements are inserted in the heating means several possibilities are feasible, which are explained later.

Further shown is a cooling means 22, like a housing or unit comprising a cooling fan or the like, which is adapted to actively cool the heated preforms, which are, as shown by the arrow P7, transferred from the heating means 21 to the cooling means 22. This transfer will also be described later. The mold element capacity of the cooling means 22 corresponds to the mold element capacity of the heating means 21, so that all heated mold elements 3 can be transferred to the cooling means 22 and be cooled simultaneously.

In this cooling means 22 the hot preforms are cooled down to an ambient temperature, whereafter they are removed from the cooling means 22, as shown by the arrow P8 to be further processed.

As this principle layout clearly shows, the molds 1 are only used for preparing the building material 7 and for shaping the form of the building material 7 according to the requested preform shape and for fixing the building material 7 to the respective mold element 3. Right after the respective mold element 3 is removed from the mold carrier, a new mold element 3 may be put in place on the mold carrier, which new mold element 3 is completely surface cleaned to ensure that the building material 7 may be properly arranged.

The heating process is completely separated from the mold area. As only the heating is performed in the heating means, this heating means can be held on a constant temperature, which allows a very short heating operation.

The same holds for the cooling means 22, which allows for a separated cooling step, and which cooling means 22 can also be maintained on a certain cooling temperature or allows to actively run a certain cooling ramp in order to enhance the cooling.

Thus, an almost constant manufacturing may be realised, as it is constantly possible to provide respective loaded mold elements 3 ready for the heating and cooling processing. The time, for which a mold 1 is occupied, is very short and corresponds almost only to the time needed for arranging a new mold element 3 in place, loading the building material 7 and fixing it, and for removing the loaded mold element 3. As both the heating means 21 and the cooling means 22 are adapted to receive several mold elements, also the heating and cooling process is significantly faster, as a certain number of mold elements may simultaneously be processed.

Figure 4:
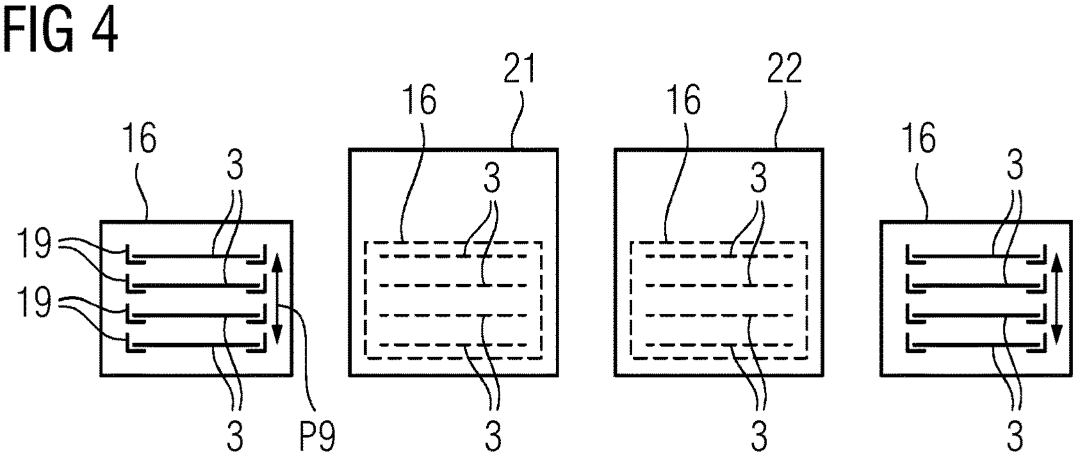
FIG. 4 is a principle illustration of a second alternative for transferring the mold elements into the heating means and into the cooling means.

FIG. 4 shows a first alternative regarding the transfer of the mold elements 3 into the heating means 21 and the cooling means 22. In this embodiment the mold elements 3 are arranged in the transport means 16, i.e., the rack 17, and are received on respective receiving means 19, which are, as shown by the double arrow P9, vertically movable, as previously mentioned.

In this embodiment, the complete transport means 16 with all the mold elements 3 moves into the heating means 21 and stay's there during the heating process. When the heating process is finished, the transport means 16 moves out of the heating means 21 and directly into the cooling means 22 to be finally cooled. After the cooling step is finished, the whole transport means 16 with the cool mold elements 3 comprising the cooled preforms is moved out of the cooling means 22, whereafter the mold elements 3 may be removed from the transport means 16 and the finished preforms may be removed from the mold elements 3 for further processing. In an alternative the transport means 16 may be moved to a storage area for storing the finished preforms.

The mold elements 3 will be, after the preforms are removed, automatically surface cleaned and will be automatically recirculated again for being arranged on an unloaded mold carrier 2 again.

In the embodiment of FIG. 5, again a transport means 16 respectively a rack 17 is shown, which comprises several mold elements 3 arranged on a respective vertically movable receiving means 19, as shown again by the arrow P9.

The heating means 21 is equipped with separate receiving means 23 which are vertically movable, as shown by the double arrow P10. The separate mold elements 3 of the transport means 16 are, as shown by the arrow P11, horizontally moved from the transport means 16 to the heating means 21 respectively from a receiving means 19 to a receiving means 23. For example, only the lowest mold element 3 is moved to the lowest position in the heating means 21. In the next step, the next mold element 3 of the transport means 16 is lowered, while the previous mold element received in the heating means 21 is raised, so that a new transfer may start until all mold elements are unloaded. As soon as the transport means 16 is unloaded, it returns to again receive new mold elements 3.

After the heating process is finished, the separate mold elements 3 are transferred to the cooling means 22. The set-up of the cooling means 22 is comparable to the set-up of the heating means 21. Also, the cooling means 22 comprises receiving means 24, which are, see the double arrow P12, vertically movable. Again, by using respective transfer means, as shown by the arrow P13, separate and single mold elements 3 are moved from the heating means 11 respectively a receiving means 23 to the cooling means 22 respectively a receiving means 24. Also, here the respective vertical movement is performed.

After the cooling is finished, the mold elements 3 with the cooled preforms are transferred to another transport means 25, again a rack, with a respective receiving means 26 for receiving the respective mold elements 3, as shown by the arrow P14. The receiving means 26 are, as shown by the arrow P15, also vertically movable. With this transport means 25 the mold elements 3 with the finished preforms may be transported to a storage area or to a further processing device etc.

It is to be noted that the transport means 25 is only optional. It is certainly possible to transfer the separate cooled mold elements 3 for example to a respective conveyor belt or the like and to transport them into a storage area or to a lifting device for vacuum-lifting the finished preforms from the mold element for further processing the preforms. The emptied mold element 3 will then be surface cleaned if so needed and recirculated.

Figure 5:
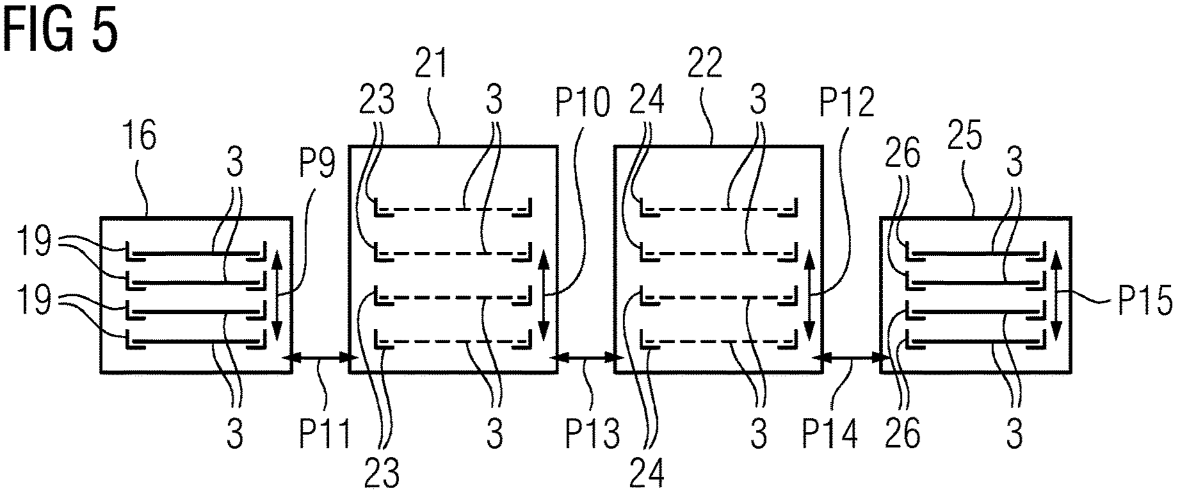
FIG. 5 is a principle illustration of a third alternative for transferring the mold elements into the heating means and into the cooling means.
Figure 6:
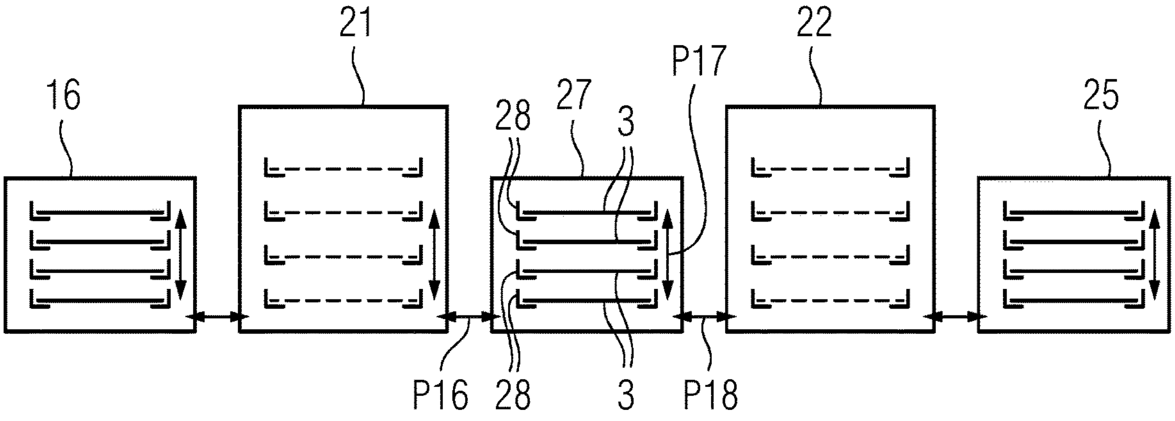
FIG. 6 is a principle illustration of a fourth alternative for transferring the mold elements into the heating means and into the cooling means.

FIG. 6 shows an embodiment with a first transport means 16, which set-up is identically to the transport means 16 of FIG. 5. Also, the heating means 21 and the cooling means 22 correspond in their set-up and function to the heating and cooling means 21, 22 of FIG. 6. In this embodiment, the heating means 21 and the cooling means 22 are distanced, thus a direct transfer of the mold elements is not possible. For the transfer a further transport means 27 is provided, comprising respective receiving means 28, e.g., beams or rails, on which the separate mold elements 3 are received from the heating unit 21, as shown by the arrow P16. Again, the receiving means 28 can be vertically moved, as shown by the arrow P17.

After the transport means 27, again a rack, is completely loaded, it moves to the cooling means 22, where the separate mold elements 3 are unloaded as shown by the double arrow P18 onto respective receiving means 24 of the cooling unit 22. After the cooling step is finished, the mold elements 3 may again be transferred to the transport means 25 or may be directly transferred to a conveyor belt etc.

In both embodiments according to FIGS. 5 and 6 the mold elements 3 are transferred separately into and out of the heating unit. The order, in which they are transferred into and out of the heating unit 21 may be the same. This means that each mold element 3 receives the same temperature treatment respectively remains for the same process time in the heating means 21. In case a mold element 3 respectively the building elements needs a shorter or longer heat treatment, the respective mold element may remain shorter or longer in the heating unit 21 than other mold elements 3, so that the transfer order may vary depending on the needed treatment time. This is possible due to the separate mold element transfer.

Figure 7:
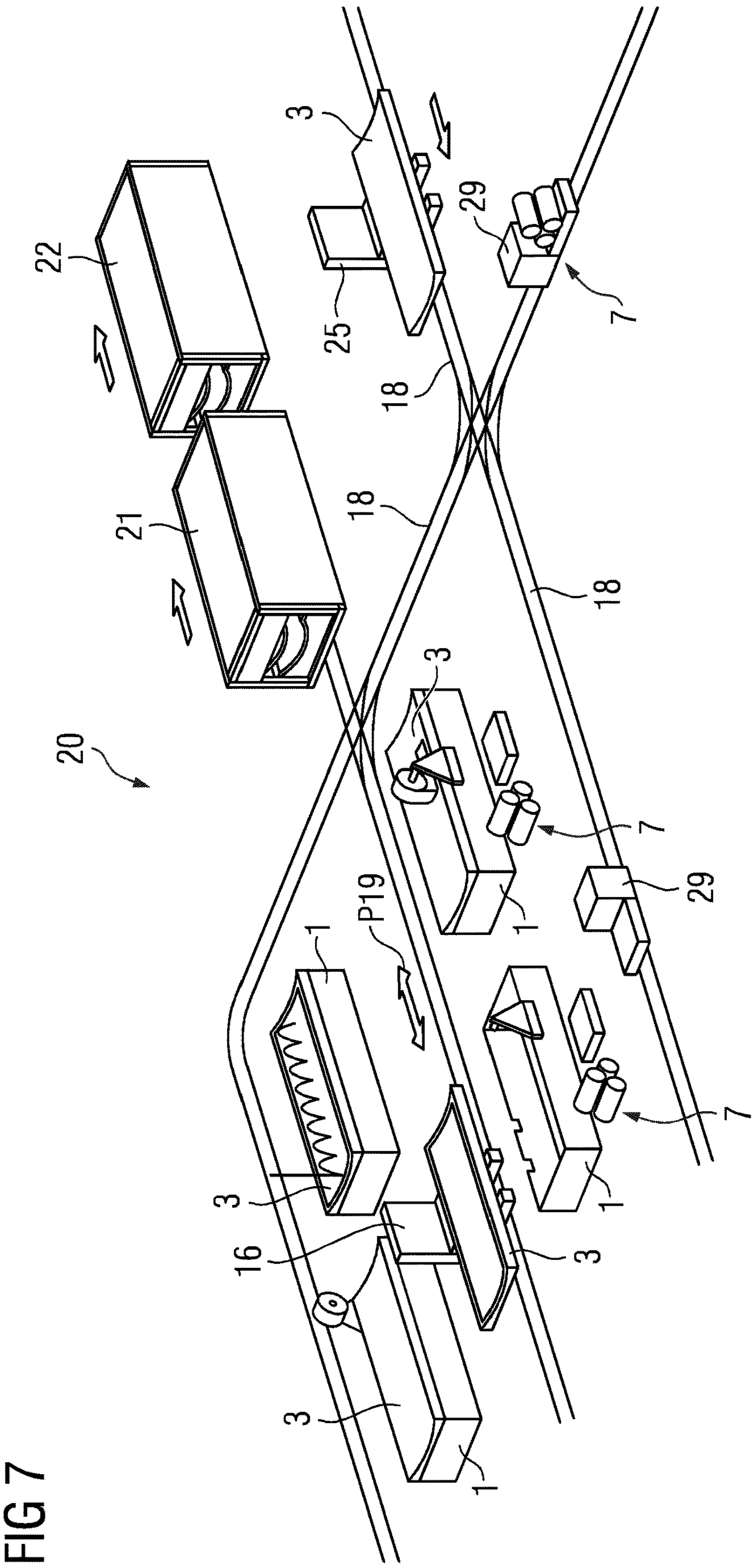
FIG. 7 is a principle illustration of a manufacturing arrangement of a second embodiment.

Finally, FIG. 7 shows another layout of a manufacturing arrangement 20. It again comprises in this example four molds 1, with each mold having a removable mold element 3. For arranging the building material 7 on the respective mold element 3, the building material 7 is arranged close to the respective mold 1 and is for example unwound from respective fiber mat rolls etc., while the binding agent is applied from respective hoppers or the like.

In this embodiment, a transport means 18 in form of a forklift is provided between the two rows of molds 1. This transport means 16 respectively forklift is adapted to take a loaded mold element 3 and to transport it to the heating means 21, as shown by the arrow P19. From the heating means 21 the mold element 3 is then transferred to the cooling means 22, from where it is then further processed as described.

The empty mold element 3 is then returned by another transport means 25 like a forklift after cleaning the surface of the mold element 3 for replacing it on a mold carrier 2.

This figure also shows the various rails 18, on which the transport means 25 moves, wherein this rails 18 may also be used by respective transport cars 29 used for distributing the building material.

Although the present invention has been disclosed in the form of embodiments and variations thereon, it will be understood that numerous additional modifications and variations could be made thereto without departing from the scope of the invention.

For the sake of clarity, it is to be understood that the use of “a” or “an” throughout this application does not exclude a plurality, and “comprising” does not exclude other steps or elements.

The invention claimed is:

1. A method for manufacturing preforms for a wind turbine blade, the method comprising:

providing a mold and arranging a preform building material on a transferable mold element removably arranged on a mold carrier;

fixating the preform building material on the transferable mold element;

removing the transferable mold element with the fixated preform building material from the mold carrier and transferring into a heating means;

heating the preform building material for producing a preform; and removing the transferable mold element with the preform from the heating means and cooling the preform.

2. The method according to claim 1, wherein a mold is used comprising a mold carrier with a removable stiff tray-like mold element providing a mold surface on which the preform building material is arranged.

3. The method according to claim 1, wherein the transferable mold element with the fixated preform building material is transferred from the mold carrier to a, mold transport means and either stored in the mold transport means until transported with the mold transport means to the heating means or directly transported with the mold transport means to the heating means.

4. The method according to claim 3, wherein the mold transport means moves from a first mold carrier for receiving a first mold element to one or more further mold carriers for receiving one or more further mold elements.

5. The method according claim 4, wherein the mold transport means with one or more mold elements moves into the heating means, or that one or more mold elements are moved from the mold transport means into the heating means.

6. The method according to claim 4, wherein after the heating one or more transferable mold elements are removed from the heating means and cooled in ambient air, or are moved into a cooling means.

7. The method according to claim 6, wherein a transport means comprising the one or more transferable mold elements is transferred into the cooling means, or that the one or more transferable mold elements itself are transferred from the heating means onto a transport means, wherein the transport means remains in or moves into ambient air for cooling, or wherein the transport means moves to the cooling means, wherein either the one or more mold elements are transferred into the cooling means or the transport means moves into the cooling means, or the one or more mold elements itself are directly transferred from the heating means into the cooling means.

8. The method according to claim 1, wherein the fixating of the preform building material on the transferable mold element is performed by applying a vacuum, wherein the vacuum is released at an earliest after the heating of the preform building material.

9. A manufacturing arrangement for manufacturing preforms for a wind turbine blade, comprising:

one or more molds each comprising a mold carrier and one or more mold elements each configured to fixedly receive preform building material and removably arrangeable on the mold carrier; and a heating means configured to receive at least one of the mold elements, with the preform building material, removed from the mold carrier.

10. The manufacturing arrangement according to claim 9, wherein each mold element is a stiff tray-like mold element providing a mold surface configured to receive the preform building material with the mold carrier comprising mold element receiving means.

11. The manufacturing arrangement according to claim 9, wherein at least one mold element transport means configured to receive the one or more mold elements with the fixated preform building material for transferring the one or more mold elements to the heating means is provided.

12. The manufacturing arrangement according to claim 11, wherein the heating means is configured to receive the one or more mold elements itself or to receive the transport means comprising one or more mold elements.

13. The manufacturing arrangement according to claim 11, wherein transfer means for transferring a mold element from the mold carrier to a transport means and/or from the transport means to the heating means and/or from the heating means to a further transport means or a cooling means or from the further transport means to the cooling means are provided.

14. The manufacturing arrangement according to claim 13, wherein the transfer means comprise pushing means arranged at the mold and/or at the transport means, and/or pulling means arranged at the transport means and/or at the heating means, and/or roller elements arranged at the mold and/or the transport means bearing the mold element.

15. The manufacturing arrangement according to claim 9, wherein a cooling means is provided configured to receive the one or more mold elements with the heated preforms for cooling them.

16. The manufacturing arrangement according to claim 15, wherein the cooling means is configured to receive the one or more mold elements itself or to receive a transport means comprising the one or more mold elements.

17. The manufacturing arrangement according to claim 16, wherein the transport means is the means previously positioned in the heating means or is a further transport means configured to receive the one or more mold elements from the heating means.

18. The manufacturing arrangement according to claim 15, wherein the transport means and/or the heating means and/or the cooling means is configured to receive several mold elements itself, wherein the transport means and/or the heating means and/or the cooling means comprises vertically movable mold element receiving means for vertically stacking the several mold elements.

19. A mold for a manufacturing arrangement according to claim 9, further comprising a mold carrier and at least one interchangeable mold element, which mold element is a stiff tray-like mold element providing a mold surface configured to receive the preform building material, wherein the mold carrier comprises mold element receiving means.

20. The mold according to claim 19, wherein it comprises a transfer means for moving the mold element from the mold carrier, which transfer means comprises a pushing means and/or rolling elements arranged at the mold carrier.

* * * * *